United States Patent [19]

Burditt et al.

[11] Patent Number: 5,079,283

[45] Date of Patent: Jan. 7, 1992

[54] FREE-RADICAL MODIFIED FIRE-RETARDANT POLYPROPYLENES

[75] Inventors: Neil A. Burditt, Shaker Heights; Deenadayalu Chundury, N. Royalton, both of Ohio

[73] Assignee: Ferro Corporation, Cleveland, Ohio

[21] Appl. No.: 499,851

[22] Filed: Mar. 26, 1990

[51] Int. Cl.$^5$ ............... C08K 5/3417; C08K 5/06; C08K 5/14

[52] U.S. Cl. ............... 524/94; 524/142; 524/370; 524/380; 524/410; 524/411; 524/412; 524/467; 524/469

[58] Field of Search ........... 524/410, 411, 412, 94, 524/467, 469, 380, 142; 523/125, 127, 136, 137; 525/333.8, 376, 337, 388, 359.3, 359.5, 359.6, 387; 522/120, 124

[56] References Cited

U.S. PATENT DOCUMENTS

| | | | |
|---|---|---|---|
| 2,811,514 | 10/1957 | Hagemeyer | 525/359.3 |
| 3,239,482 | 3/1966 | Rapp | 524/411 |
| 3,259,593 | 7/1966 | Eichhorn | 524/467 |
| 3,419,518 | 12/1968 | Mahling et al. | 524/412 |
| 3,511,824 | 5/1970 | Listner | 525/359.6 |
| 3,598,708 | 8/1971 | Jackson | 525/359.3 |
| 3,912,792 | 10/1975 | Touval | 524/469 |
| 3,953,655 | 4/1976 | Steinkamp et al. | 260/876 |
| 4,011,375 | 3/1977 | Freedman et al. | 523/127 |
| 4,373,046 | 2/1983 | Hagiwara et al. | 524/467 |
| 4,451,589 | 5/1984 | Mormon et al. | 523/124 |
| 4,525,516 | 6/1985 | Garcia et al. | 524/467 |
| 4,900,766 | 2/1990 | Kubo et al. | 523/136 |

FOREIGN PATENT DOCUMENTS

331075  3/1972  U.S.S.R.
1042178  9/1966  United Kingdom.

*Primary Examiner*—Veronica P. Hoke
*Attorney, Agent, or Firm*—Daniel J. Hudak Co.

[57] ABSTRACT

A flame-retardant polypropylene composition comprises a modified polypropylene-based polymer, antimony oxide or sodium antimonate, and a halogenated organic compound or, in lieu thereof, a phosphorous-containing compound. The polypropylene-based polymer is modified in the presence of a free-radical generator source which typically is an organic peroxide so that it has a narrow polydispersity range, improved flow, and lower compounding and molding temperatures so that temperature-sensitive components are protected from thermal degradation. The modification of the polypropylene-based polymer generally occurs in situ in the processing apparatus and the composition can also contain various fillers, fibers, and the like.

21 Claims, No Drawings

FREE-RADICAL MODIFIED FIRE-RETARDANT POLYPROPYLENES

FIELD OF THE INVENTION

The present invention generally relates to flame-retardant polypropylene compositions wherein a polypropylene-based polymer is modified in situ so that it has a lower polydispersity through the use of the various free radical generator sources as during the processing thereof. The polypropylene composition can also contain various flame retardants, fillers, and the like.

BACKGROUND ART

Heretofore, whenever flame retardants have been added to various thermoplastic polymers such as polypropylenes, various physical properties have been affected such as reduced impact strength and enhanced flexural modulus. However, various polypropylenes containing flame retardants exhibit processibility problems, especially the processing of large, injection-molded parts. Such flow problems have been somewhat alleviated by increasing the processing temperature. However, increased processing temperatures cause instability problems such as undesirable color changes, as well as major problems such as decomposition resulting in polymer breakdown and inferior properties.

Non-flame retardant polyolefin compositions have had their molecular weight distribution altered.

For example, U.S. Pat. No. 3,953,655, to Steinkamp et al, relates to modified polymers, particularly polyolefins, which have improved flow and in some instances improved adhesion properties over that of a polymeric, e.g., polyolefin base stock used as a starting material, and are produced by a controlled reaction often involving degradation in an extruder, in which an initiator is injected under conditions of either maximum distribution or intensive mixing wherein appreciable rheological changes, i.e., molecular weight distribution, in said base polymer occur. In some embodiments, monomers are also grafted to said base stock, during said degradation process. In such instances, grafted polymers with high melt flow properties are obtained.

U.S. Pat. No. 4,451,589, to Morman, relates to thermoplastic polymers with improved processibility resulting from initial partial degradation of high molecular weight polymers using a chemical prodegradant present in excess of the amount reacted during pelletization. This class of polymers includes polymers and copolymers of propylene and butylene. After pelletizing, the polymer, including unreacted prodegradant, can be safely handled and shipped without difficulty. When remelted by extruding or the like, the prodegradant in the pellets reacts, further reducing the molecular weight as well as narrowing the molecular weight distribution of the polymer to a point where high capacity production of quality fibers and extruded products can be obtained.

British Patent No. 1,042,178, to Trieschmann et al, relates to a process for narrowing the molecular weigh distribution of polyolefins by degradation at temperatures between the melting point and the temperature at which purely thermal degradation of the polyolefins occurs, by means of high shear gradients.

SUMMARY OF THE INVENTION

Flame-retardant polypropylene-based polymer compositions containing antimony oxide and various halogenated organic compounds or phosphorous-containing compounds have improved flow as well as higher heat distortion temperatures when the polypropylene-based polymer is modified in situ by various free radical generator sources so that the polypropylene-based polymer has a lower polydispersity and generally a higher melt index. The improved flow characteristics improve processibility such as injection molding and permit lower processing temperatures during compounding and molding to be utilized and such are highly desirable since flame-retardant compositions tend to be very heat-sensitive and, at times, even degrade upon processing. Improved flow also permits easier molding, faster cycle times, and aesthetic molded polypropylene compositions.

The amount of the various flame retardants which are utilized are generally dictated by a desirable UL (Underwriters Laboratories, Inc.) 94 flammability rating. The UL 94 test is a vertical burning test. A material having a V-0 rating allows only minimal burning and no flaming drip of a standard bar of specified thickness. The V-1 rating allows longer burn times than the V-0, but not flaming drip. The V-2 rating allows the same burn time as the V-1 and also allows flaming drip. The Fail rating is given any material not meeting the V-0, V-1, or V-2 criteria. The choice of the variously rated flame-retardant polypropylene-based polymers depends upon the end use. Thus, where a minimal degree of flame retardancy is desired by and useful to the end user, flame-retardant polypropylene-based polymers having a V-2 rating are satisfactory.

The various polypropylene-based, flame-retardant compositions of the present invention exhibit improved heat stability in comparison to V-2 rated polypropylenes of the prior art.

DETAILED DESCRIPTION

The polypropylene-based polymers of the present invention are generally polypropylene homopolymers or copolymers containing ethylene repeating units as the comonomer. When a propylene-ethylene copolymer is utilized, the amount of ethylene repeating units therein can generally be any amount, with up to about 20 percent by weight being desired.

Other polypropylene-based polymers include blends of either of the above-noted polypropylene homopolymer, and/or propylene-ethylene copolymer with (a) ethylene-propylene-diene-copolymers, i.e., EPDM and-/or (b) a block copolymer containing at least one A block and at least one B block wherein the A block contains repeating units made from a vinyl substituted aromatic and the B block contains repeating units made from a conjugated diene. The block copolymer can be a diblock copolymer such as an AB block copolymer, a triblock copolymer such as an ABA block copolymer, a multiblock having a plurality of A and B blocks such as $(AB)_n$ where n is any desired integer, or radial/star blocks of A and B, or combinations of any of the above. Considering the EPDM copolymers, the amount of the diene repeating units is generally small as up to about 10 percent by weight and desirably up to about 4 percent by weight. Hence, the remaining portion of the copolymer is made up of ethylene and propylene repeating units in generally any amount. Examples of suitable dienes include 1,4-hexadiene, dicyclopentadiene, ethylidene norbornene, methylene norbornene, and the like.

Such EPDM copolymers are well known to the art as well as to the literature.

The A portion of the block copolymers are generally made from a vinyl-substituted aromatic having from about 8 to about 15 carbon atoms such as styrene, alpha-methylstyrene, vinyl toluene, 4-n-propylstyrene, 4-t-butylstyrene, and the like. The B portion of the block copolymer is generally made from a diene having from 4 to 10 carbon atoms such as hexadiene, pentadiene, isoprene, butadiene, as well as the various isomers thereof, with butadiene and isoprene being preferred. The B block portion can subsequently be hydrogenated. Such block copolymers are known to the art and to the literature. For example, an AB diblock copolymer or an ABA triblock copolymer where A is styrene and B is butadiene and are commercially available from the Shell Chemical Company as KRATON D or KRATON G (hydrogenated). A triblock copolymer made from styrene-butadiene-styrene is preferred. An example of a multiblock copolymer is STEREON from Firestone. An example of a commercially available radial/star block copolymer is K-RESIN from Phillips or Fina.

The amount of either the polypropylene homopolymer and/or propylene-ethylene copolymer with a) EPDM and/or the b) block copolymer is an amount such that a continuous polypropylene and/or polypropylene-ethylene matrix, that is, a continuous phase, is formed, desirably at least 70 percent, and preferably at least 80 percent by weight. Hence, the remaining difference is the amount by weight of either the EPDM copolymer, the ABA copolymer, or blends thereof.

The polypropylene-based copolymer can also be a blend of the polypropylene homopolymer and/or the propylene-ethylene copolymer, with either (c) polyethylene and/or d) copolymers of ethylene. Generally, any type of polyethylene can be utilized including ultra-low density polyethylene (ULDPE), low density polyethylene (LDPE), high density polyethylene (HDPE), high molecular weight-high density polyethylene (HMW-HDPE), as well as ultra-high molecular weight polyethylene (UHMWPE). The various copolymers of ethylene are generally made from vinyl acetate monomers as well as other vinyl esters having from about 2 to about 6 carbon atoms in the ester portion, or from various acrylates wherein the ester portion of the acrylate contains from 2 to about 8 or 10 carbon atoms, with specific examples including methyl acrylate, ethyl acrylate, butyl acrylate, 2-ethylhexyl acrylate, and the like. The amount of either the polypropylene homopolymer and/or the propylene-ethylene copolymer with (c) polyethylene and/or (d) copolymers of ethylene is such that a polypropylene and/pr polypropylene-ethylene matrix exists, that is, a continuous phase, desirably from at least 70 percent by weight, and preferably at least 80 percent by weight. Accordingly, the amount of the polyethylene and/or copolymers of ethylene constitute the difference.

According to the concepts of the present invention, the polypropylene-based polymers can also include blends of the polypropylene homopolymer and/or propylene-ethylene copolymer with EPDM and/or the block copolymers on one hand, with the above-noted blends of polypropylene and/or propylene-ethylene copolymer with polyethylene and/or copolymers of ethylene on the other hand. The amount of the blends with regard to one another can generally vary so long as a polypropylene and/or polypropylene-ethylene matrix, that is, a continuous phase, exists.

The polypropylene homopolymer, the propylene-ethylene copolymer, or blends thereof, are preferred.

The above-noted polypropylene-based polymers are generally commercially available and have a weight average molecular weight of up to about 1,000,000, and desirably from about 100,000 to about 300,000. The polydispersity of the polymers is generally greater than 5 up to about 12, and preferably from about 6.5 to about 9.0. The melt flow or melt index as measured by ASTM test D-1238 is typically from 1.0 to about 15 and desirably from about 3 to less than 6.

The polypropylene-based compositions of the present invention contain antimony oxide or sodium antimonate in effective amounts to improve the flame retardancy of the polypropylene. Generally, an effective amount is from about 0.1 to about 15 or 25 parts by weight per 100 parts by weight of the polypropylene-based polymer. When a V-2 rating is desired, low amounts of the antimony component are utilized as from about 1.0 to about 5.0 parts by weight and desirably from about 2.0 to about 3.0 parts by weight per 100 parts by weight of the polypropylene-based polymer. When a higher UL-94 rating is desired, such as a V-0 rating, naturally, larger amounts of the antimony component are utilized such as from about 10 to about 15 parts by weight and desirably from about 12 to about 14 parts by weight per 100 parts by weight of the polypropylene-based polymer.

Various halogenated organic compounds are utilized in association with the antimony component since combination of the two components generally yield synergistic results with regard to flame retardancy. Examples of suitable halogenated organic compounds include brominated dipentaerythritol, tetrabromobisphenol A, ethylene-bistetrabromophthalimide, ethylene-bisdibromonorbornane-dicarboximide, tetrabromobisphenol A-bis(2,3-dibromo-propyl ether), octabromodiphenyl oxide, hexabromocyclododecane, hexabromodiphenoxy ethane, decabromodiphenoxy ethane, decabromodiphenyloxide, tetradecabromodiphenoxy benzene, brominated polystyrene tetradecabromodiphenyloxide, poly-dibromophenylene oxide, phenoxy terminated bisphenol A carbonate oligomers containing from about 50 to about 60 percent bromine, brominated epoxy resins containing from about 30 to about 60 percent bromine, and mixtures thereof. Halogenated organic compounds which are especially preferred include decabromodiphenyloxide, decabromodiphenoxy benzene, brominated polystyrene, tetrabromobisphenol A-bis(2,3-dibromopropyl ether), and ethylene bisdigromonorbornane-dicarboximide. Effective amounts of the halogenated organic compounds are utilized to produce desired flame-retardant properties. Generally such effective amounts are from about 2 to about 60 parts by weight. When a V-2 rating is desired, the amount of the halogenated organic compound is desirably from about 3 to about 9 parts by weight and preferably from about 4 to about 7 parts by weight for every 100 parts by weight of the polypropylene-based polymer. When a V-0 rating is desired, larger amounts are utilized as from about 25 to about 60 parts by weight, and desirably from about 27 to about 30 parts by weight for every 100 parts by weight of the polypropylene-based polymer.

In lieu of the halogenated organic compounds, a phosphorous-containing compound can be utilized. Generally, any organophosphorus compound which will cause char can be utilized, with stabilized ammonium polyphosphates being commonly used. The amount of the phosphorous-containing compound generally required to achieve either a V-0 rating or a V-2 rating is up to about 50 parts by weight and desirably from about 25 to about 30 parts by weight for every 100 parts by weight of the polypropylene-based polymers.

The composition can also contain various traditional additives in conventional amounts. For example, various fillers and pigments can be added such as talc, calcium carbonate, entoninte, wollastonite, clay, silica, magnesium carbonate, dolomite, carbon black, titanium dioxide, and the like. The amounts of said fillers generally range from about 5 to about 60 and desirably from about 10 to about 50 for every 100 parts by weight of the polypropylene-based polymer. Various nucleating agents, antioxidants, blowing agents, light stabilizers, processing aids, and the like, well known to the art and to the literature, can also be utilized when desired generally in small amounts as up to about 5 parts by weight for every 100 parts by weight of the polypropylene-based polymer.

According to the present invention, generally any free radical generator source can be utilized to conduct an in situ modification of the polypropylene-based polymer. Such in situ modification generally occurs in a processing device, such as an extruder, for example, a twin-screw or a single-screw extruder, an intensive mixer, a Buss kneader, an injection molding apparatus, or the like. Customarily, the processing device should be operated at a temperature sufficient to melt the one or more polypropylene-based polymer which naturally will vary with molecular weight. Usually, temperatures of from about 325° F. to about 500° F. can be utilized with from about 400° F. to about 450° F. being preferred. The torque of the processing device should be fairly sufficient to masticate the polypropylene-based polymer and generally has from moderate to high torque. Typically, all of the various components forming the polypropylene composition of the present invention are added to the processing device wherein they are mixed and blended and wherein the polypropylene-based polymer is modified.

Free radical generator sources can generally be chemical, such as the various organic peroxides, various azo compounds, and the like, or physical which usually causes polymer scission, such as radiation including ultraviolet radiation, mechanical energy, heat, oxidizing agents such as ozone, ultrasonic sound, plasma, radio waves such as microwaves, and the like.

Considering the various peroxides which can be utilized, hydroperoxides of the formula R—O—O—H, wherein R is an alkyl having from 1 to 8 carbon atoms, can be utilized with specific examples including cumene hydroperoxide, t-butyl hydroperoxide, t-amyl hydroperoxide, and the like.

Another class of peroxides are the various alkyl peroxides generally of the formula $R^1$—O—O—$R^2$, where $R^1$ and $R^2$, independently, are an alkyl group having from about 4 to about 9 carbon atoms with specific examples including t-butyl cumyl peroxide, dicumyl peroxide, di-t-butyl peroxide, 2,5-dimethyl-2,5-di(t-butylperoxy)hexane, and the like.

The peroxide esters or peroxide acids constitute another class and generally have the formula

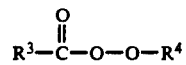

where $R^3$ and $R^4$, independently, are an alkyl group having from 4 to 9 carbon atoms, with specific examples including gama-cumyl peroxy-neodecanoate, t-butylperoxy pivalate, t-butylperoxy-2-ethylhexanoate,t-butylperoxymaleic acid, and the like.

Still another peroxide class includes the various diacyl peroxides of the general formula

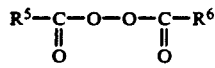

where $R^5$ and $R^6$, independently, have from 1 to 8 carbon atoms and include various alkyl substituted aromatic compounds. Specific examples include dibenzoyl peroxide, decanoyl peroxide, lauroyl peroxide, diisononanoyl peroxide, and the like.

The various peroxyketals constitute yet another group and generally has the formula

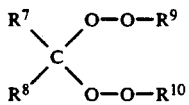

where $R^7$ through $R^{10}$, independently, can include various functional groups such as an ester or a hydrocarbon functional group having from 1 to 7 carbon atoms. Examples of specific peroxy ketals include ethyl 3,3-di-(t-amylperoxy)-butyrate; 2,2-di-(t-amylperoxy)propane; 1,1-di-(t-butylperoxy)-cyclohexane;2,2-bis-(t-butylperoxy)butane, and the like.

Another source of free radical generators are the various azo compounds having the general formula

where $R^{11}$ and $R^{12}$, independently, are various organic groups such as aliphatics, aromatics, alkyl substituted aromatics, and the like, having from 1 to about 18 carbon atoms. Various specific examples of azo free radical generators include:
2,2'-azobis(4-methoxy-2,4-dimethylpentanenitrile)
2,2'-azobis(2,4-dimethyl-pentanenitrile)
2,2'-azobis(2-methylpropanimidamide) dihydrochloride
2,2'-azobis(isobutyronitrile)
2,2'-azobis(2-methylbutanenitrile)
4,4'-azobis(4-cyanopentanoic acid)
1,1'-azobis(cyclohexanecarbonitrile)
2,2'-azobis(2-acetoxypropane)
2-(tert-butylazo)-4-methoxy-2,4-dimethylpentanenitrile
2-(tert-butylazo)-2,4-dimethylpentanenitrile
4-(tert-butylazo)-4-cyanopentanoic acid
2-(tert-butylazo)isobutyronitrile
2-(tert-butylazo)-2-methylbutanenitrile
1-(tert-amylazo)cyclohexanecarbonitrile
1-(tert-butylazo)cyclohexanecarbonitrile
1-(tert-butylazo)-formamide In any event, the in situ reacted polypropylene-based polymers have a reduced polydispersity. Generally, an effective amount of the various chemical free radical generator sources is utilized such that the polydispersant is reduced to about 2.5 to about 10, desirably from about 2.5 to about 6.0 or less than 6.0, and preferably from about 3 to about 4. The melt index is also generally increased and can have values up to about 200 and preferably from about 6 to about 100. Such effective amounts of the chemical-type free radical generator molecules are generally from about 0.01 to about 5 parts by weight and preferably from about 0.1 to about 1.5 parts by weight for every 100 parts by weight of the polypropylene-based polymer. The free radical generators can be added in concentrated form, or diluted in a solvent or a carrier.

The various physical sources of free radical generators commonly involve a form of energy which attacks the tertiary hydrogen atom on the polypropylene-based polymer chain and removes the same therefrom, thus creating a free radical. The free radical is generally thought to be subject to attack, and through chain scission the polydispersity is reduced and the melt index increased to values as noted hereinabove.

Numerous types of radiation sources can be utilized with the most common being cobalt 60, low and high energy electron accelerators, light energy (ultraviolet to visible), infrared energy, heat, plasma or glow discharge energy sources (e.g., microwave or radio free frequency range), ultrasonic sound, oxidizing agents such as ozone, and the like. Such physical forms of energy which can be utilized as well as others are set forth in the *Encyclopedia of Polymer Science and Engineering*, Vol. 4, 1986, pages 630 through 696, which is hereby fully incorporated by reference.

Of the various free radical generator sources which can be utilized, the chemical and especially the peroxides are preferred.

As noted above, a preparation of the modified polypropylene is usually in situ within the processing apparatus and, hence, can be accomplished by a one-shot process wherein the polypropylene-based polymer, the halogenated-organic component, the antimony component, and other conventional fillers and the like, are added to the mixing device and heated along with any chemical free radical generator sources, and the like. Due to the reduction in the polydispersity and the increased melt flow index, processing such as compounding and molding can be conducted at generally lower temperatures than without the use of the various free radical generator sources. That is, the modified polypropylene-based polymer of the present invention can generally be processed at temperatures at least 20° F. lower and desirably at least 50° F. lower than flame-retarded polypropylenes which do not contain organic peroxides therein, as in accordance with the present invention. Such lower processing temperatures abate, reduce, and even eliminate color deformation and degradation of the final end product composition.

The compositions of the present invention are useful especially for making molded injection articles such as medical disposal boxes for the receipt, storage, and eventual disposal of contaminated medical products; for electrical boxes and connectors, electrical materials, and the like.

The invention will be better understood by reference to the following examples.

The compounding of the flame-retardant polypropylene compositions described herein was carried out in a standard counter-rotating twin-screw extruder (34mm American Leistritz). The starting material was introduced into the extruder in the indicated amounts through a funnel; compounding was continuous with the screws being operated at 100 rpm and the temperature being maintained at or below 450° F. The polypropylene was extruded through a two-hole die into a water bath, then air-dried and chopped into pellets about ⅛" long and 3/16" in diameter.

The pellets were then processed in a Van Dorn injection molder having a 6-ounce shot capacity and a 110-ton clamping capacity. Various configuration specimens were molded to carry-out the tests described in Tables I, II, III, and IV.

TABLE I

|  | 1 | 2 | 3 | 4 |
|---|---|---|---|---|
| Shell 7C12N[1], a propylene-ethylene copolymer containing a major amount of propylene repeating units therein | 100.00 | 100.00 | 100.00 | 100.00 |
| DBDPO[2] | 3.81 | 3.83 | 3.93 | 3.91 |
| Sb$_2$O$_3$ (THERMOGUARD S, M & T Chemical) | 1.90 | 1.91 | 1.97 | 1.95 |
| CR-10[3] | — | 0.53 | — | 0.54 |
| Liquid Color[4] | — | — | 3.28 | 3.26 |
| Melt Index ASTM D-1238 (230° C.; 2160 g)(g/10 min.) | 27 | 95 | 32 | 76 |
| UL-94 ⅛" BARS | V-2 | V-2 | V-2 | V-2 |
| 1/16" BARS | V-2 | V-2 | Fail | V-2 |
| 1/32" BARS | Fail | V-2 | Fail | V-2 |

[1]Shell polypropylene 7C12N has a melt flow rate of 22 grams/10 min. at 230° C.
[2]DBDPO is decabromodiphenyl oxide.
[3]CR-10 is a peroxide concentrate available from Polyvel, Inc., Hammonton, New Jersey. CR-10 contains 10% Lupersol 101 [2,5-dimethyl-2,5-bis-[t-butylperoxyl]hexane] in a non-reactive polymer carrier. It is heat activated and practical activity occurs at temperatures above 190° C.
[4]Liquid color was "Rosemar," from Ferro Corporation, 1000 Lakeside, Cleveland, Ohio 44114, a rosy beige.

As apparent from Table I, the use of a in situ free radical generator source yielded a dramatic increase in the melt index and also improved the UL-94 flame retardancy. The polydispersity of compositions 2 and 4 was also reduced.

TABLE II

|  | 1 | 2 |
|---|---|---|
| PP Copolymer (Shell 7C12N) | 100.00 | 100.00 |
| Tetradecabromodiphenoxy benzene | 3.93 | 3.95 |
| Sb$_2$O$_3$ (THERMOGUARD S, M&T Chemical) | 1.97 | 1.98 |
| CR-10[3] | — | 0.55 |
| Liquid Color | 3.28 | 3.29 |
| Melt Index ASTM D-1238 (230° C; 2160 g) (g/10 min) | 26 | 54 |
| UL-94 ⅛" BARS | V-2 | V-2 |
| 1/16" BARS | Fail | V-2 |

As apparent form Table II, once again a dramatic improvement in the melt flow index was obtained when a free radical generator source was utilized an in situ and improved V-2 values were also obtained. The polydispersity of composition 2 was also reduced from that of composition 1.

TABLE III

|  | 1 | 2 | 3 |
|---|---|---|---|
| PP Copolymer (Shell 7C12N) | 100.00 | 100.00 | 100.00 |
| DBDPO | 5.57 | 5.51 | 5.66 |
| Sb$_2$O$_3$ (THERMOGUARD S, M&T Chemical) | 2.79 | 2.75 | 2.83 |
| Talc (Cantal 45.90) | 46.44 | 45.91 | 47.17 |
| CR-10 | — | 0.38 | — |

TABLE III-continued

|  | 1 | 2 | 3 |
|---|---|---|---|
| PCL-5[1] | — | — | 1.57 |
| Melt Index ASTM D-1238 (230° C; 2160 g) (g/10 min) | 25 | 63 | 52 |
| UL-94 ⅛" BARS | V-2 | V-2 | V-2 |
| 1/16" BARS | V-2 | V-2 | V-2 |
| 1/32" BARS | Fail | V-2 | V-2 |

[1]dicumyl peroxide (5 percent) concentrate from Polyvel Inc.

As apparent from Table III, generally large increases in the melt index were obtained utilizing an in situ free radical generator source such as a peroxide, and good flame retardancy values were also obtained. The polydispersity of Examples 2 and 3 were also reduced. Moreover, the use of talc did not affect the melt flow.

Table IV relates to the use of a phosphate-containing compound as well as a chlorine-containing compound.

TABLE IV

|  | 1 | 2 | 3 | 4 | 5 | 6 |
|---|---|---|---|---|---|---|
| Profax 6523[1] | 35 | 34.5 | 55 | 54.5 | 75 | 74.5 |
| Zerogen 15[2] | 65 | 65 | — | — | — | — |
| CR-10 | — | 0.5 | — | 0.5 | — | 0.5 |
| Dechlorane Plus 25[3] | — | — | 35 | 35 | — | — |
| Firebrake ZB[4] | — | — | 6 | 6 | — | — |
| Thermoguard S[5] | — | — | 4 | 4 | — | — |
| Exolit IFR-11[6] | — | — | — | — | 25 | 25 |
| Test Results |  |  |  |  |  |  |
| Melt Flow 230°/2160 wt. | 5.4 | 18.0 | 10.8 | 25.2 | 6.5 | 18.0 |
| UL-94 |  |  |  |  |  |  |
| ⅛" bar | V-1 | V-1 | V-0 | V-0 | V-0 | V-0 |
| 1/16" bar | Fail | V-2 | V-1 | V-0 | V-2 | V-2 |
| 1/32" bar | Fail | V-2 | V-2 | V-2 | V-2 | V-2 |
| Oxygen Index | 28.9 | 28.2 | 30 | 31.7 | 34.2 | 35.8 |

[1]Himont 6523 - homopolymer propylene
[2]Zerogen 15 is a magnesium hydroxide from Solem Industries
[3]Dechlorane Plus is described as a chlorine-containing cycloaliphatic compound (from Occidental Chemical Corp.)
[4]Firebrake ZB is a zinc borate from U.S. Borax & Chemical Corp.
[5]Thermoguard S is an antimony oxide from M & T Chemical Corp.
[6]Exolit IFR-11 is described as a phosphorous-containing char-forming flame retardant (from Hoechst-Celanese Corp.)

As apparent from Table IV, once again the use of a free radical generator during processing yielded improved results with regard to the flame retardancy, improved melt flow, and the like, as well as other physical properties.

As apparent from Tables I through IV, although the polypropylene compositions contained flame-retardants therein which generally adversely effect various properties, it was unexpected that a higher melt flow index would be obtained. The improvement of processing properties with regard to flame-retardant, polypropylene-based compositions is achieved utilizing an in situ process.

While in accordance with the Patent Statutes, the best mode and preferred embodiment has been set forth, the scope of the invention is not limited thereto, but rather by the scope of the attached claims.

What is claimed is:

1. A flame-retardant polypropylene composition, comprising a blend of:
   about 100 parts by weight of a polypropylene-based polymer, said polypropylene-based polymer being
   1) a polypropylene homopolymer,
   2) a copolymer of propylene and ethylene,
   3) a blend of said polypropylene homopolymer and said propylene-ethylene copolymer,
   4) a blend of said polypropylene homopolymer, said propylene-ethylene copolymer, or said blend of said polypropylene homopolymer and said propylene-ethylene copolymer with (a) an EPDM copolymer and/or (b) a block copolymer containing at least one A block and at least one B block wherein said A block is made from a vinyl substituted aromatic monomer having from 8 to 15 carbon atoms and wherein said B block is made from a conjugated diene monomer having from 4 to 10 carbon atoms,
   5) a blend of said polypropylene homopolymer, said propylene-ethylene copolymer, or said blend of said polypropylene homopolymer and said propylene-ethylene copolymer with (c) a polyethylene and/or (d) a copolymer of ethylene and a vinyl ester, wherein said ester portion has from 2 to 6 carbon atoms, or an acrylate wherein said ester portion of said acrylate has from 2 to 10 carbon atoms, or
   a blend of said 4) and said 5),
   an effective amount of an antimony component containing antimony oxide, sodium antimonate, or combinations thereof, to improve flame retardancy,
   said polypropylene-based polymer modified by chain scission in the presence of from about 0.01 to about 5.0 parts by weight per 100 parts by weight of said polypropylene-based polymer of a chemical free radical generator source, said antimony component, and a halogen organic compound, said modified polypropylene-based polymer having reduced polydispersity, a higher ASTM D1238 melt flow index, and processible at a temperature of at least 20° F. lower, in comparison with said unmodified polypropylene-based polymer,
   of said halogenated organic compound to improve flame retardancy, said halogen-containing compound being brominated dipentaerythritol, tetrabromobisphenol A, ethylene-bistetrabromophthalimide, ethylene bis dibromo norbornanedicarboximide, tetrabromobisphenol A-bis(2,3-dibromo-propyl ether), octabromodiphenyl oxide, hexabromocyclododecane, hexabromodiphenoxy ethane, decabromodiphenoxy ethane, decabromodiphenyl oxide, tetradecabromodiphenoxy benzene, brominated polystyrene, polydibromophenyleneoxide, phenoxy terminated bisphenol A carbonate oligomers containing from about 50 to about 60 percent bromine, brominated epoxy resins containing from about 30 to about 60 percent bromine, or combinations thereof.

2. A flame-retardant polypropylene composition according to claim 1, wherein the amount of said diene repeat units in said (a) EPDM copolymer is up to about 10 percent by weight, wherein in said 4) blend the amount of said polypropylene homopolymer, said propylene-ethylene copolymer, or said blend of said polypropylene homopolymer and said propylene-ethylene copolymer is an amount sufficient to form a continuous phase, and wherein in said 5) blend the amount of said polypropylene homopolymer, said propylene-ethylene copolymer, or said blend of said polypropylene homopolymer and said propylene-ethylene copolymer is an amount sufficient to form a continuous phase.

3. A flame-retardant polypropylene composition according to claim 2, wherein the amount of said antimony compound is from about 0.1 to about 15 parts by weight per 100 parts by weight of said polypropylene-based polymer, wherein the amount of said halogenated organic compound is from about 2 parts to about 60 parts by weight per 100 parts by weight of said polypropylene-based polymer.

4. A flame-retardant polypropylene composition according to claim 3, wherein said modified polypropylene-based polymer has a polydispersity of from about 2.5 to about 10.0 and a melt flow index according to ASTM D1238 of from about 3 to about 200.

5. A flame-retardant polypropylene composition according to claim 4, wherein said chemical free radical generating source is a hydroperoxide having the formula

wherein R is an alkyl having from 1 to 9 carbon atoms, an alkyl peroxide having the formula

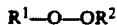

wherein $R^1$ and $R^2$, independently, is an alkyl group having from 4 to 9 carbon atoms,
a peroxy ester having the formula

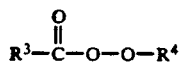

wherein $R^3$ and $R^4$, independently, is an alkyl group having from 4 to 9 carbon atoms,
a diacyl peroxide having the formula

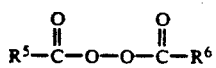

wherein $R^5$ and $R^6$, independently, is an alkyl group containing from 1 to 8 carbon atoms, or
a peroxyketal having the formula

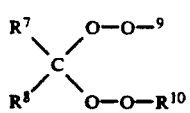

wherein $R^7$, $R^8$, $R^9$ and $R^{10}$, independently, is an ester or a hydrocarbon functional group having from 1 to 7 carbon atoms,
an azo compound having the formula

wherein $R^{11}$ and $R^{12}$, independently, is an aliphatic, an aromatic, or an alkyl substituted aromatic having from 1 to 18 carbon atoms, or combinations thereof.

6. A flame-retardant polypropylene composition according to claim 5, wherein said propylene-ethylene copolymer contains up to 20 percent by weight of ethylene repeat groups therein, wherein said (a) EPDM copolymer contains up to 4 percent by weight of diene repeat units therein.

7. A flame-retardant polypropylene composition according to claim 8, wherein said propylene-based polymer is said polypropylene homopolymer, said propylene-ethylene copolymer, or said blend of said polypropylene homopolymer and said propylene-ethylene copolymer, wherein said modified polypropylene-based polymer has a polydispersity of from about 2.5 to about 6.0 and an ASTM D1238 melt flow index of from about 6 to about 100, wherein the weight average molecular weight of said propylene-based homopolymer is from about 100,000 to about 300,000, and wherein said halogenated organic compound is decabromodiphenyloxide, decabromodiphenoxy benzene, tetradecabromodiphenoxy benzene, brominated polystyrene, tetrabromobisphenol-A-bis(2,3-dibromopropyl ether), dibromonornane-dicarboximide, or combinations thereof, and wherein said antimony compound is antimony oxide.

8. A flame-retardant polypropylene composition according to claim 9, wherein said chemical free radical generator compound is 2,5-dimethyl-2,5-di(t-butylperoxy)hexane in an amount of from about 0.1 to about 1.5 parts by weight per 100 parts by weight of said polypropylene homopolymer, said propylene-ethylene copolymer, or said blend of said polypropylene homopolymer and said propylene-ethylene copolymer.

9. A flame-retardant polypropylene composition according to claim 7, wherein said modified polypropylene-based polymer is processable at a temperature of at least 50° F. below the processable temperature of said non-modified polypropylene-based polymer.

10. A flame-retardant polypropylene composition according to claim 1, wherein said polypropylene-based polymer is modified in situ.

11. A flame-retardant polypropylene composition according to claim 5, wherein said polypropylene-based polymer is modified in situ.

12. A flame-retardant polypropylene composition according to claim 7, wherein said polypropylene-based polymer is modified in situ.

13. A flame-retardant polypropylene composition according to claim 9, wherein said polypropylene-based polymer is modified in situ.

14. A process for preparing a flame retardant polypropylene composition having a high melt index, comprising the steps of:
adding and blending an effective amount of an antimony component containing antimony oxide, sodium antimonate, or combinations thereof, and from about 2 to about 60 parts, based on 100 parts by weight of polypropylene, of a halogenated organic compound to a polypropylene-based polymer to improve the flame retardancy thereof,
said halogen organic compound being brominated dipentaerythritol, tetrabromobisphenol A, ethyhlenebistetrabromophthalimide, ethylene bis dibromo norbornane-dicarboximide, tetrabromobisphenol A-bis(2,3-dibromo-propyl ether), octabromodiphenyl oxide, hexabromocyclododecane, hexabromodiphenoxy ethane, decabromodiphenoxy ethane, decabromodiphenyl oxide, tetradecabromodiphenoxy benzene, brominated polystyrene poly-dibromophenylene oxide, phenoxy terminated bisphenol A carbonate oligomers containing from about 50 to about 60 percent bromine, brominated epoxy resins containing from about 30 to about 60 percent bromine, or combinations thereof, and
in situ modifying by chain scission said polypropylene-based polymer in the presence of from about 0.01 to about 5.0 parts by weight per 100 parts by weight of said polypropylene-based polymer of a chemical free radical generator source, said antimony component and said halogenated organic compound, and producing a modified polypropylene-based polymer having a lower polydispersity, a higher ASTM D1238 melt index, and processing at a temperature of at least 20° F. lower, in comparison with said unmodified polypropylene-based polymer, said polypropylene-based polymer being
1) a polypropylene homopolymer,
2) a copolymer of propylene and ethylene,
3) a blend of said polypropylene homopolymer and said propylene-ethylene copolymer,
4) a blend of said polypropylene homopolymer, said propylene-ethylene copolymer, or said blend of said polypropylene homopolymer and said propylene-ethylene copolymer with (a) an EPDM copolymer and/or
b) a block copolymer containing at least one A block and at least one B block wherein said A block is made from a vinyl substituted aromatic monomer having from 8 to 15 carbon atoms and wherein said B block is made from a conjugated diene monomer having from 4 to 10 carbon atoms,
5) a blend of said polypropylene homopolymer, said propylene-ethylene copolymer, or said blend of said copolymer with (c) a polyethylene and/or (d) a copolymer of ethylene and a vinyl ester, wherein said ester portion has from 2 to 6 carbon atoms, or an acrylate wherein said ester portion of said acrylate has from 2 to 10 carbon atoms, or
a blend of said 4) and said 5).

15. A process according to claim 14, wherein the weight average molecular weight of said polypropylene-based polymer is up to about 1,000,000.

16. A process according to claim 15, wherein the amount of said diene repeat units in said (a) EPDM copolymer is up to about 10 percent by weight, wherein in said 4) blend the amount of said polypropylene homopolymer, said propylene-ethylene copolymer, or said blend of said polypropylene homopolymer and said propylene-ethylene copolymer is an amount sufficient to form a continuous phase, and wherein in said 5) blend the amount of said polypropylene homopolymer, said propylene-ethylene copolymer, or said blend of said polypropylene homopolymer and said propylene-ethylene copolymer is an amount sufficient to form a continuous phase.

17. A process according to claim 16, wherein the amount of said antimony compound is from about 0.1 to about 15 parts by weight per 100 parts by weight of said polypropylene-based polymer, wherein the amount of said halogenated organic compound is from about 2 parts to about 60 parts by weight per 100 parts by weight of said polypropylene-based polymer, wherein the amount of said phosphorous-containing compound is up to about 50 parts by weight per 100 parts by weight of said polypropylene-based polymer, wherein said modified polypropylene-based homopolymer has a polydispersity of from about 2.5 to about 10.0 and a melt flow index according to ASTM D1238 of from about 3 to about 200, wherein said chemical free radical generating source is a hydroperoxide having the formula 
R—O—OH wherein R is an alkyl having from 1 to 9 carbon atoms, an alkyl peroxide having the formula $R^1$—O—O$R^2$ wherein $R^1$ and $R^2$, independently, is an alkyl group having from 4 to 9 carbon atoms,
a peroxy ester having the formula

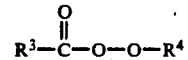

wherein $R^3$ and $R^4$, independently, is an alkyl group having from 4 to 9 carbon atoms,
a diacyl peroxide having the formula

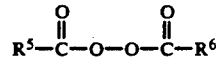

wherein $R^5$ and $R^6$, independently, is an alkyl group containing from 1 to 8 carbon atoms, or
a peroxyketal having the formula

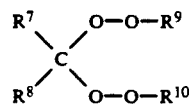

wherein $R^7$, $R^8$, $R^9$ and $R^{10}$, independently, is an ester or a hydrocarbon functional group having from 1 to 7 carbon atoms,
an azo compound having the formula $R^{11}$—N=N—$R^{12}$ where $R^{11}$ and $R^{12}$, independently, is an aliphatic, an aromatic, or an alkyl substituted aromatic having from 1 to 18 carbon atoms, and combinations thereof.

18. A process according to claim 17, wherein said polypropylene-based polymer is said polypropylene homopolymer, said propylene-ethylene copolymer, or said blend of said polypropylene homopolymer and said propylene-ethylene copolymer.

19. A process according to claim 18, wherein said modified polypropylene-based polymer has a polydispersity of from about 2.5 to about 6.0 and an ASTM D1238 melt flow index of from about 6 to about 100, wherein the weight average molecular weight of said polypropylene-based polymer is from about 100,000 to about 300,000, and wherein said halogenated organic compound is decabromodiphenyloxide, decabromodiphenoxy benzene, tetradecabromodiphenoxy benzene, brominated polystyrene, tetrabromobisphenol-A-bis(2,3-dibromopropyl ether), ethylene bis dibromonorbornane dicarboximide, or combinations thereof, wherein said antimony compound is antimony oxide, wherein said chemical free radical generator compound is 2,5-dimethyl-2,5-di(t-butylperoxy)hexane in an amount of from about 1 to about 3 parts by weight per 100 parts by weight of said polypropylene homopolymer or copolymer.

20. A process according to claim 19, wherein said in situ processing temperature is from about 400° to about 450° F.

21. A process according to claim 20, including obtaining a flame retardant modified polypropylene-based polymer composition having a processing temperature which is at least 50° F. lower than said non-modified polypropylene-based polymer.

* * * * *